United States Patent [19]

Rubinchik

[11] Patent Number: 5,689,148
[45] Date of Patent: Nov. 18, 1997

[54] MULTI-POLE, TWO-SPEED BRUSH HOLDER ASSEMBLY

[75] Inventor: Ilya Rubinchik, London, Canada

[73] Assignee: Siemens Electric Limited, Mississauga, Canada

[21] Appl. No.: 608,457

[22] Filed: Feb. 28, 1996

Related U.S. Application Data

[63] Continuation-in-part of Ser. No. 495,135, Jun. 19, 1995, which is a continuation-in-part of Ser. No. 234,737, Apr. 19, 1994, abandoned.

[51] Int. Cl.[6] .................. H02K 39/38; H02K 15/00
[52] U.S. Cl. .................. 310/239; 310/42; 310/242
[58] Field of Search .................. 310/239, 242, 310/71, 42

[56] References Cited

U.S. PATENT DOCUMENTS

| | | | |
|---|---|---|---|
| 1,954,910 | 1/1934 | Allen | 171/324 |
| 3,510,709 | 5/1970 | Walker | 310/239 |
| 3,654,504 | 4/1972 | Susdorf er al. | 310/239 |
| 3,656,018 | 4/1972 | Maher | 310/242 |
| 3,716,735 | 2/1973 | Dippold | 310/240 |
| 4,114,061 | 9/1978 | Hayes | 310/241 |
| 4,115,061 | 9/1978 | Grünewälder | 8/137 |
| 4,136,295 | 1/1979 | Sweet | 310/239 |
| 4,163,167 | 7/1979 | Zelt et al. | 310/242 |
| 4,174,142 | 11/1979 | Pesce et al. | 339/5 |
| 4,329,605 | 5/1982 | Angi et al. | 310/68 R |
| 4,340,832 | 7/1982 | Cheetham et al. | 310/239 |
| 4,354,128 | 10/1982 | Chew et al. | 310/242 |
| 4,366,404 | 12/1982 | Ziegler | 310/239 |
| 4,404,488 | 9/1983 | Herr | 310/239 |
| 4,409,508 | 10/1983 | Ooki et al. | 310/239 |
| 4,498,230 | 2/1985 | Harris et al. | 29/597 |
| 4,559,465 | 12/1985 | Gagneux | 310/242 |

(List continued on next page.)

FOREIGN PATENT DOCUMENTS

| | | |
|---|---|---|
| 0 258 132 | 3/1988 | European Pat. Off. . |
| 0 343 126 | 11/1989 | European Pat. Off. . |
| 0 397 973 | 11/1990 | European Pat. Off. . |
| 0 615 316 A2 | 9/1994 | European Pat. Off. . |
| 53-132705 | 11/1978 | Japan . |
| WO 94/29935 | 12/1994 | WIPO . |

OTHER PUBLICATIONS

Seven-page European Search Report No. PCT/CA96/00438 mailed on Nov. 10, 1996.

Seven-page European Search Report No. PCT/CA95/00241 mailed on Apr. 8, 1995.

*Primary Examiner*—Steven L. Stephan
*Assistant Examiner*—Michael J. Wallace, Jr.

[57] ABSTRACT

A multi-pole, multi-speed brush holder assembly is created by joining a first speed brush holder assembly and a second speed brush holder assembly together, back-to-back, with an apertured spacer sandwiched between them. A plurality of brush holders are disposed on the cards' front faces and spaced circumferentially around a central aperture of the respective card. Brushes are guided by the brush holders and spring-biased toward the respective aperture for engaging a respective commutator of a motor armature. On each card, a respective first electric conductor segment is disposed flat against the card's back face and electrically connects the brush of a first of the card's brush holders with the brush of a second of the card's brush holders. On each card, a respective second electric conductor segment is disposed flat against the card's back face to electrically connect the brush of a respective third of the card's brush holders with the brush of a respective fourth of the card's brush holders. The first conductor segment of one card is spaced radially outwardly of the second conductor segment on the same card; on the other card, it is spaced radially inwardly. The first conductor segments are on a common radius and in mutual abutment to provide continuity of the first and second brush holders on one card with the first and second brush holders on the other card. The spacer's thickness is no greater than the sum of the thicknesses of the first conductor segments on the two cards.

23 Claims, 10 Drawing Sheets

U.S. PATENT DOCUMENTS

| | | | |
|---|---|---|---|
| 4,593,220 | 6/1986 | Cousins et al. | 310/239 |
| 4,593,221 | 6/1986 | Harris et al. | 310/242 |
| 4,607,184 | 8/1986 | Takahaski et al. | 310/247 |
| 4,782,261 | 11/1988 | Crevling, Jr. et al. | 310/242 |
| 4,845,396 | 7/1989 | Huber | 310/239 |
| 4,851,730 | 7/1989 | Fushiya et al. | 310/249 |
| 4,866,322 | 9/1989 | Baumeister et al. | 310/239 |
| 4,868,441 | 9/1989 | Bulick | 310/239 |
| 4,994,701 | 2/1991 | Bulick | 310/239 |
| 5,053,665 | 10/1991 | Yamaguchi et al. | 310/239 |
| 5,159,222 | 10/1992 | Southall | 310/239 |
| 5,162,688 | 11/1992 | Bouton | 310/239 |
| 5,196,750 | 3/1993 | Strobl | 310/239 |
| 5,434,463 | 7/1995 | Horski | 310/248 |

MULTI-POLE, TWO-SPEED BRUSH HOLDER ASSEMBLY

REFERENCE TO RELATED APPLICATIONS AND INCORPORATION BY REFERENCE

This application is a continuation-in-part of pending application Ser. No. 08/495,135 filed 28 Jun. 1995, which is a continuation-in-part of application Ser. No. 08/234,737, filed 28 Apr. 1994 now abandoned. The disclosures of those applications are incorporated herein by reference.

FIELD OF THE INVENTION

This invention in general relates to rotating electrical machines, such as direct current (D.C.) motors for example, and more particularly to brush holder assemblies (i.e. brush card assemblies) for such machines.

BACKGROUND AND SUMMARY OF THE INVENTION

As mentioned in the latter of Applicant's above-referenced applications, U.S. Pat. Nos. 4,559,465 (Gagneux), 4,354,128 (Chew et al), 4,782,261 (Crevling, Jr. et al), 4,994,701 (Bulick), 4,366,404 (Ziegler), and 4,409,508 (Ooki) describe various forms of brush holder assemblies.

The disclosures of the Applicant's above-referenced pending patent applications include novel forms of brush holders and brush holder assemblies. One significant attribute of those novel forms of brush holders is a generic characteristic that provides for usage in various brush holder assemblies. With respect to usage in D.C. electric motors of the type commonly used in automotive vehicle, such as for power window lifts, cooling modules, etc., those novel forms can be used in a variety of applications, including multiple-pole, and single- and multiple-speed, motors. One advantage of those novel forms is to reduce the number of parts in, and manufacturing operations for, brush holder assemblies, thereby providing more cost-efficient manufacture. Another advantage is to provide brush holder assemblies having improved space utilization.

One embodiment disclosed in Applicant's above-referenced applications comprises a brush holder assembly for a multi-pole, single-speed motor comprising a base member, or brush card, comprising a central aperture having elongated slots at ninety degree intervals around its circumference. An inner bus bar member is disposed on the brush card to locate brush holders at one pair of diametrically opposite slots. The brush holders of the inner bus bar member are on one face, i.e., a first side of the brush card and an integral bus bar segment connecting these diametrically opposite brush holders is on the other face, i.e., second side, of the brush card. An outer bus bar member is disposed on the brush card to locate brush holders in another pair of diametrically opposite slots. The brush holders of the outer bus bar member are on the one face of the brush card. An integral bus bar segment of the outer bus bar member is disposed on the other face of the brush card in spaced concentric relation to the bus bar segment of the inner bus bar member. Each brush is guided by the respective brush holder for radial motion. A constant force spring is associated with each brush holder and is disposed to urge the respective brush radially inwardly toward the center of the central aperture, and hence into electrical contact with a commutator of the electrical machine that passes through the central aperture of the brush card when the brush holder assembly is assembled into a motor.

Another embodiment of brush holder assembly disclosed in Applicant's above-referenced applications is for a multi-pole, two-speed motor. That embodiment comprises two brush holder assemblies, each embodying generic characteristics of the novel single-speed brush holder assembly, assembled in back-to-back relation and separated by an intervening insulator disk.

The present application discloses further improvements relating to multi-pole, two-speed brush holder assemblies. While the examples that are presented herein to disclose these further improvements may have certain features in common with the disclosures of the Applicant's above-referenced applications, these further improvements possess their own novel and unique characteristics that are generic to multi-pole, two-speed D.C. electric machines, such as those used in the various applications enumerated above.

One aspect of the invention relates to a multi-pole, two-speed brush holder assembly comprising a high-speed brush holder assembly and a low-speed brush holder assembly wherein the high-speed brush holder assembly comprises a non-electrically conductive brush card having opposite axial faces, i.e., a first side and a second side, and a central aperture extending between those faces, a plurality of brush holders disposed on one of the card's faces and spaced circumferentially around the aperture, electrically conductive brushes guided by the brush holders for motion radially of the aperture, springs for urging the brushes radially inward toward the aperture, an electric conductor disposed on the other of the card's faces and electrically connecting the brush of a first of the brush holders with the brush of a second of the brush holders, the low-speed brush holder assembly comprising a non-electrically conductive brush card having opposite axial faces and a central aperture extending between the latter faces, a plurality of brush holders disposed on one of the latter card's faces and spaced circumferentially around the latter aperture, electrically conductive brushes guided by the latter brush holders for motion radially of the latter aperture, springs for urging the latter brushes radially inward toward the latter aperture, and an electric conductor disposed on the other of the latter card's faces and electrically connecting the brush of a first of the latter brush holders with the brush of a second of the latter brush holders, and means joining the brush cards together with the other faces of the brush cards mutually confronting and with the electric conductors mutually abutting to establish electric continuity between the electric conductors, wherein the brushes of brush holders on the high-speed brush holder assembly's brush card, other than the brushes of the first and second brush holders on the high-speed brush holder assembly's brush card, do not have electric continuity with the brushes of any brush holders on the low-speed brush holder assembly's brush card, and wherein the brushes of brush holders on the low-speed brush holder assembly's brush card, other than the brushes of the first and second brush holders on the low-speed brush holder assembly's brush card, do not have electric continuity with the brushes of any brush holders on the high-speed brush holder assembly's brush card.

Another aspect of the invention relates to a multi-pole, multi-speed brush holder assembly comprising a first speed brush holder assembly comprising a non-electrically conductive brush card having opposite axial faces, i.e., a first side and a second side, and a central aperture extending between the faces, a plurality of brush holders disposed on one of the card's faces and spaced circumferentially around the aperture, electrically conductive brushes guided by the brush holders for motion radially of the aperture, springs for urging the brushes radially inward toward the aperture, an electric conductor disposed on the other of the card's faces and electrically connecting the brush of a first of the brush holders with the brush of a second of the brush holders, a second speed brush holder assembly comprising a non-electrically conductive brush card having opposite axial faces and a central aperture extending between the latter faces, a plurality of brush holders disposed on one of the latter card's faces and spaced circumferentially around the latter aperture, electrically conductive brushes guided by the latter brush holders for motion radially of the latter aperture, springs for urging the latter brushes radially inward toward the latter aperture, an electric conductor disposed on the other of the latter card's faces and electrically connecting the brush of a first of the latter brush holders with the brush of a second of the latter brush holders, and means joining the brush cards together with the other faces of the brush cards mutually confronting and with the electric conductors mutually abutting to establish electric continuity between the electric conductors, and a spacer sandwiched between the first and second speed brush holder assemblies and having aperture means to allow the electric conductors to be mutually abutting to establish electric continuity between the electric conductors.

These and other advantages and aspects of the invention will become apparent from the following drawings and detailed description.

DESCRIPTION OF THE PREFERRED EMBODIMENT

Figure 1:
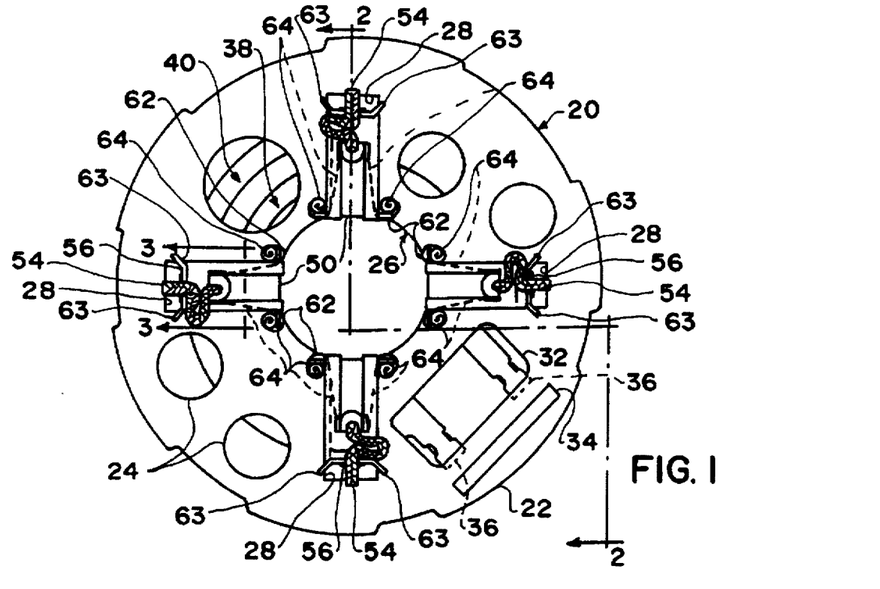
FIG. 1 is a plan view of one face of a four-pole, single-speed brush holder assembly.
Figure 4:
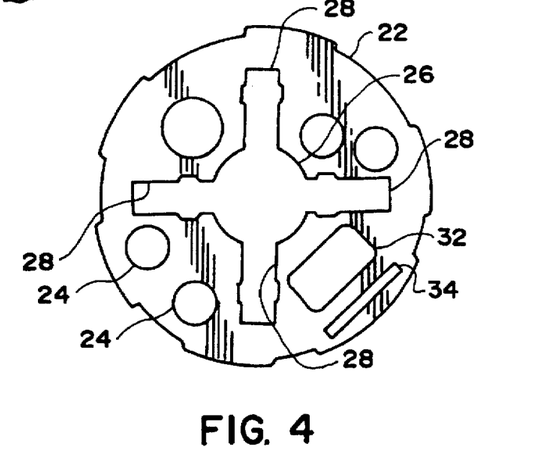
FIG. 4 is an ensmalled plan view of one face of the brush card of the brush holder assembly of FIG. 1.
Figure 10:
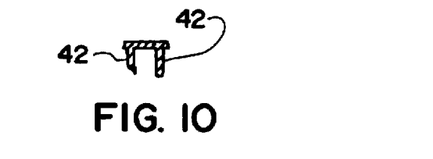
FIG. 10 is a fragmentary section view as taken along line 10—10 in FIG. 5.

FIG. 1 shows a brush holder assembly 20 having a brush card 22 (illustrated by itself in FIG. 4) fabricated from a non-electrically conductive material. Brush card 22 has a plurality of apertures, such as apertures 24. A larger central aperture 26 having four elongated slots 28 equally spaced around its periphery provides for the mounting of brush holders 30. In addition there are a pair of apertures 32, 34 to provide for mounting of an electric connector plug (not shown) and its electrical connection to wiring tabs 36 that are formed at an end of an inner bus bar member 38 and at an end of an outer bus bar member 40 which are respectively illustrated in FIGS. 5 and 11. FIG. 10 illustrates downturned portions 42 at the sides of wiring tabs 36 which provide for attaching a respective conductor from such an electric connector plug to the respective bus bar member.

Figure 5:
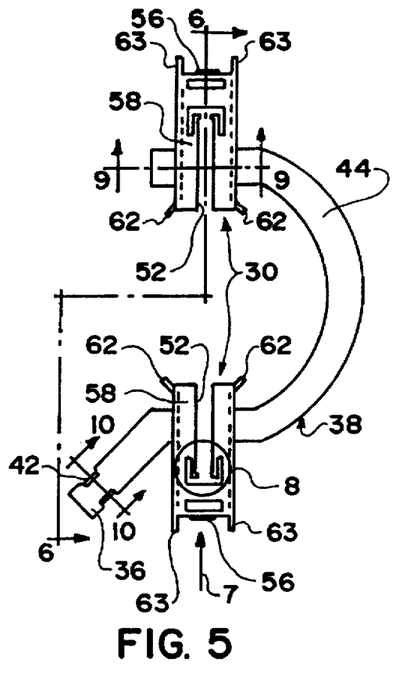
FIG. 5 is a plan view of the inner bus bar member of the brush holder assembly of FIG. 1 prior to association with the brush card.
Figure 6:
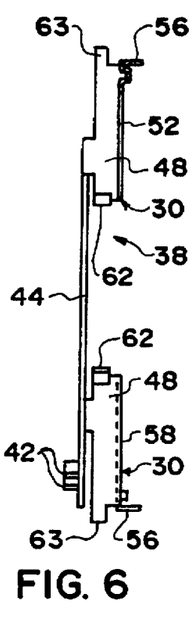
FIG. 6 is a view, partly in section, as taken along line 6—6 in FIG. 5.
Figure 7:
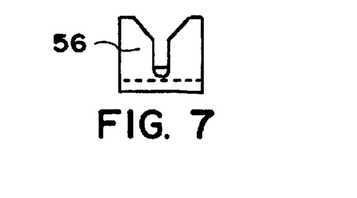
FIG. 7 is an enlarged end view taken in the direction of arrow 7 in FIG. 5.

Inner bus bar member 38 shown in FIGS. 5 and 6 is fabricated from strip stock of flexible, resilient, electrically conductive material, such as brass, with brush holders 30 being formed in position as shown, utilizing known fabrication technology, such a progressive die stamping. This creates diagonally opposite brush holders 30 which are integrally connected together through a bus bar segment 44.

Figure 8:
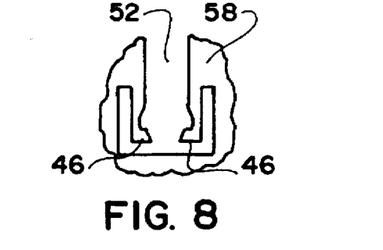
FIG. 8 is an enlarged view in circle 8 in FIG. 5.
Figure 9:
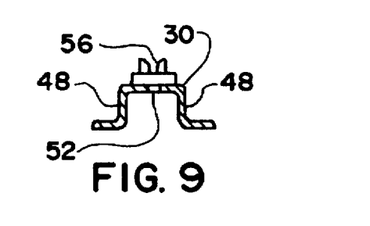
FIG. 9 is a section view as taken along line 9—9 in FIG. 5.

Brush holders 30 are all identical. Each brush holder has a pair of parallel sidewalls 48 which are spaced to accommodate a brush 50. Each brush holder 30 also has a top wall 58 formed with a slot 52, for supporting a respective brush for radial travel, at least one locking tab 46 (see FIG. 8) to hold the brush in a fully radially retracted position prior to assembly of the brush holder assembly into a motor; and a notched end wall 56 to accommodate a wire 54 attached to the brush.

Figure 11:
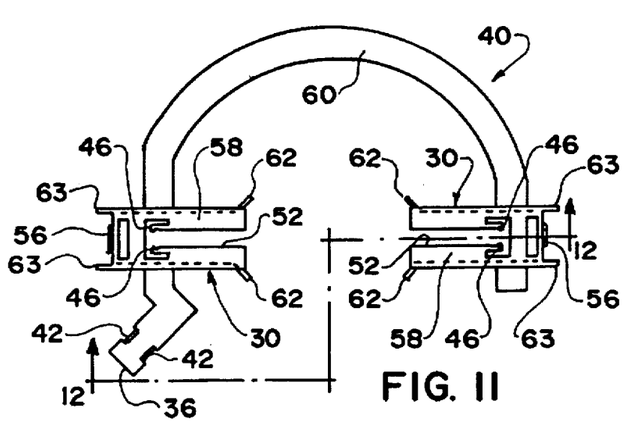
FIG. 11 is a plan view of the outer bus bar member of the brush holder assembly of FIG. 1 prior to association with the brush card.
Figure 12:
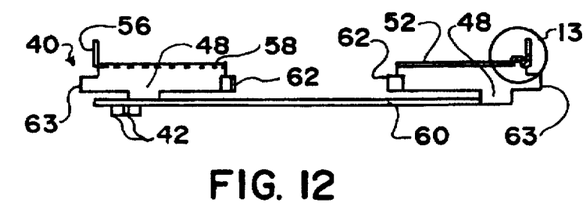
FIG. 12 is a view, partly in section, as taken along line 12—12 in FIG. 11.
Figure 13:
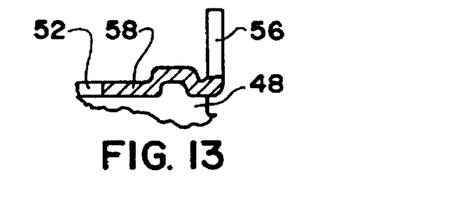
FIG. 13 is an enlarged plan view in circle 13 in FIG. 12.

FIG. 11 is similar to FIG. 5 with the sole exception that a bus bar segment 60 extends along a larger radius than does bus bar segment 44. The reason for this is that upon completion of the process of assembling the individual parts to create a brush holder 20, bus bar segments 44 and 60 will be electrically and physically spaced apart.

FIGS. 5, 6, 11, and 12 show an outwardly turned tab 62 integral with the radially inner end of each brush holder sidewall 48. Tabs 62 function to both secure the radially inner portion of a brush holder on the brush card and to locate a spring means 64 that urges the brush radially toward the center of the brush holder assembly. The spring means is shown in FIG. 1 as a flat spring strip having coiled ends contained by the sidewalls 48 and tabs 62 of the brush holder. The spring means extends from one coiled end, through space between one side of the brush and the inside of one sidewall 48, across the radially outer end of the brush, and back through space between the opposite side of the brush and the inside of the opposite sidewall 48 to the other coiled end.

The brush holder assembly is fabricated by placing inner bus bar member 38 and one face of brush card 22 and then advancing the two toward each other so that brush holders 30 become inserted into respective elongated slots 28. The flexibility and resiliency of the brush holder material will form a sandwich construction in which a certain region of the brush card is between bus bar segment 44 and its two brush holders 30. FIG. 1 shows that after such association of bus bar members 38 and 40 with brush card 22, tabs 62 are further bent at right angles to sidewalls 48, and additional tabs 63 toward the outer end of each sidewall are turned angularly to sidewalls 48 to secure the attachment of members 38, 40 to brush card 22. Wiring tabs 36 are thereby positioned proximate apertures 32, 34.

Next outer bus bar member 40 is assembled to the brush card in the same way, but with its brush holders positioned ninety degrees from those of member 38. Thus, excluding brushes 50 and spring means 64, only three separate parts are used, requiring no additional staking or riveting other than the turning of tabs 62, 63 as already described for assembly of member 38 to brush card 22.

In each brush holder assembly 20, the outer peripheral surface of the brush card is keyed to properly locate the brush holders in the motor.

The foregoing has disclosed a method for assembly of a multi-pole brush holder or brush card assembly for a four-pole, single-speed DC motor comprising the steps of: fabricating a brush card from an electrically nonconductive material to have a central aperture with four elongated slots extending equally angularly outwardly from the central aperture thereby forming a cross-like pattern; fabricating an inner bus bar member from an electrically conductive, resilient material having a pair of brush holders integrally connected by means of a brush bar segment; fabricating an outer bus bar member from an electrically conductive, resilient material having a pair of brush holders integrally connected by means of a brush bar segment; inserting the brush holders of the inner bus bar member into diametrically opposite ones of the elongated slots of the brush card with the brush bar segment disposed flat against one side of the brush card and the brush holders disposed on the other side of the brush card; inserting the brush holders of the outer bus bar member into the remaining elongated slots of the brush card with the brush bar segment disposed flat against the one side of the brush card and the brush holders disposed on the other side of the brush card, whereby each brush holder of the inner bus bar member is positioned ninety degrees from a brush holder of the outer bus bar member. The bus bar members are staked to the brush card by turning integral tabs into interference with the margins of the slots in the brush card that contain the brush holders. Spring means are associated with each brush holder, and then brushes.

Another embodiment of brush holder assembly 76 is shown in FIGS. 14-18. It comprises: a generally circular, non-electrically conductive card 78 having a keyed margin for being properly located in a stationary portion of an electric motor; four brush holders 80a, 80b, 80c, 80d, all identical in this embodiment, disposed on card 78 at 90 degree intervals around a central aperture 82 of card 78; two insulated electric wires 84a, 84c; four brushes 86a, 86b, 86c, 86d, all identical in this embodiment, guided by respective holders 80a, 80b, 80c, 80d for radial travel relative to the center of aperture 82; and four springs, 88a, 88b, 88c, 88d, all identical in this embodiment, for urging the respective brushes radially inwardly. The ends of wire 84a are stripped of insulation to expose stranded wire that attaches to brush holders 80a, 80b, while the ends of wire 84c are stripped of insulation to expose stranded wire that attaches to brush holders 80c, 80d.

Figure 17:
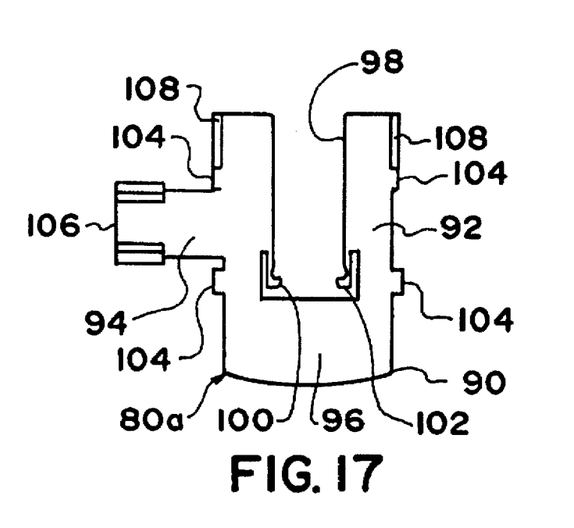
FIG. 17 is a top plan view of one of the brush holders of FIG. 14, shown by itself on an enlarged scale in a condition prior to assembly to a brush card.

Each brush holder comprises a flat main body 90 that is adapted to be disposed parallel to card 78 and that is generally U-shaped as viewed in plan in FIG. 17 to provide respective parallel sidewalls 92, 94, and an outer end wall 96 extending between the two sidewalls 92, 94. The confronting edges of sidewalls 92, 94 define a slot 98 that is open at the radially inner end but closed at the radially outer end by end wall 96. Body 90 is also provided with brush locking tabs 100, 102 proximate the radially outer end of slot 98.

Figure 14:
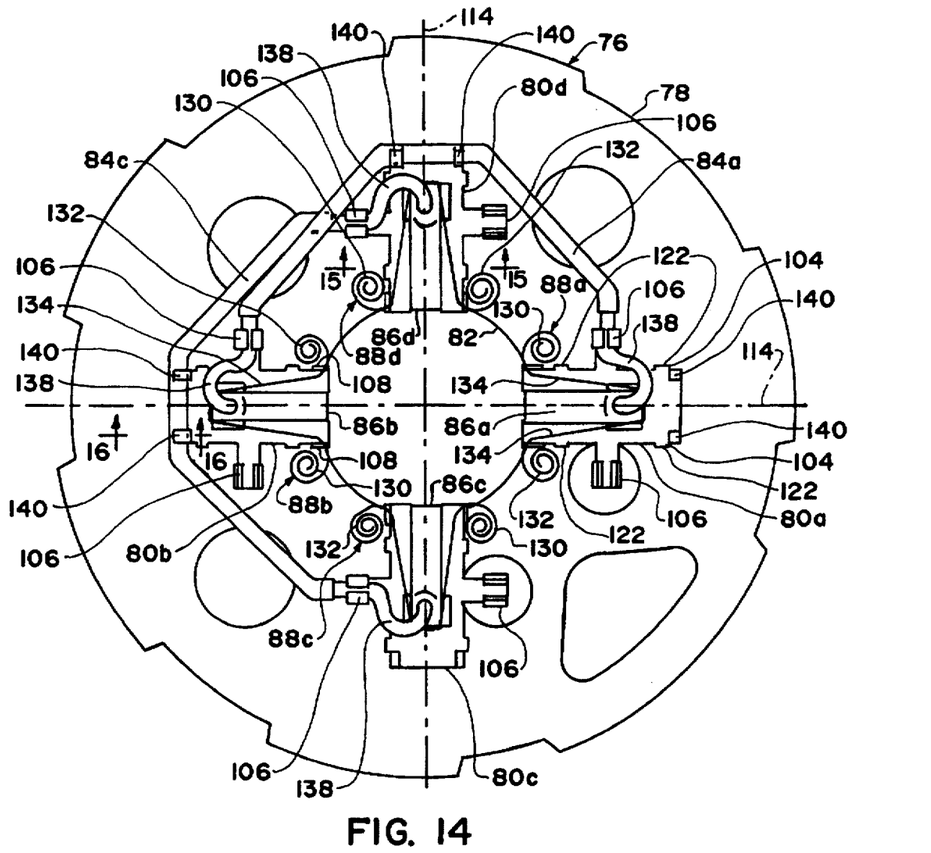
FIG. 14 is a plan view of one face of another embodiment of brush holder assembly.
Figure 18:
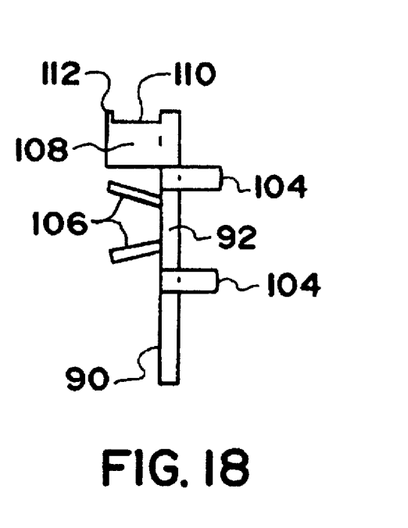
FIG. 18 is a right side view of FIG. 17.

FIGS. 17 and 18 show a condition of a brush holder where a plurality of crimping legs 104 are provided at right angles to main body 90 along the edges of sidewalls 92, 94 opposite the edge of slot 98. In this embodiment, there are two crimping legs per side, spaced apart in the same direction as the length of the slot. A respective wiring tab 106 projects laterally from main body 90 between the respective crimping legs, although only one such tab appears in FIG. 17 while FIG. 14 shows two such tabs. At the radially inner end of each brush holder there are spring locators 108 that are at right angles to main body 90, but project in the opposite direction from crimping legs 104. Each spring locator is in the form of a rectangular tab having a radially inner edge that contains a notch 110 extending from main body 90 to a small tang 112 at the corner of the spring locator 108 that is spaced from main body 90. The spring locator joins with main body 90 at a location that is just radially outward of the radially inner end of the laterally outer edge of the respective sidewall 92, 94 so that the radially inner edge of the spring locator has a U-shape that is open in the radially inner direction. (For purposes of explanation, it is to be understood that only the center line 114 of each brush and its holder lies on a radial—see FIG. 14—, and reference to the side edges of the sidewalls as being radial means approximately radial).

Figure 15:
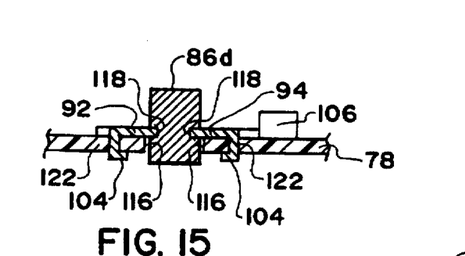
FIG. 15 is a cross section view taken along line 15—15 in FIG. 14 on a slightly enlarged scale.

At the location of each brush and holder on card 78, the card is provided with a rectangular slot 116 extending radially outwardly from aperture 82. The brushes are rectangular in shape and the width of each slot 116 is slightly larger than that of the brush. The slot also has a radial length that is suitable for the brush. FIG. 15 shows the sides of the brushes having slots 118 into which the inner edges of the sidewalls 92, 94 are received. Slots 118 extend radially to provide for brush travel lengthwise of slot 98, i.e. radial to the center of aperture 82. The portion of the brush shown in FIG. 15 below slots 118 has clearance to the sides of slot 116, while the opposite portion of the brush extends above the slots 118.

Card 78 comprises a pattern of four apertures 122 disposed in the margin of each slot 116 in a pattern corresponding to the pattern of crimping legs 104. The condition of each holder depicted in FIG. 18 provides for the holder to be assembled to the card by registering the projecting ends of the crimping legs with apertures 122 and bodily pushing the holder and card together to pass the crimping legs through the apertures 122 until main body 90 is disposed flat against and parallel with the card. The far ends of the legs are then turned at an angle (see FIG. 15) into interference with the margin of the apertures 122 to secure the holder in proper position on the card.

Each spring 88a, 88b, 88c, 88d is a flat strip of spring material comprising a uniform width that is just slightly less than the long dimension of notch 110. Each spring comprises coils 130, 132 at opposite ends and a connecting segment 134 extending from these coils. A spring is assembled to a holder by placing one coil 130 outside of the radially inner end of the corresponding sidewall 92 and the other coil 132 outside of the opposite sidewall 94 so that the connecting segment 134 spans the open inner end of the holder, passing through the respective notches 110. A brush is assembled by inserting its slots 118 onto the inner edges of the sidewalls 92, 94 at the radially inner end of the holder and abutting the radially outer end of the brush against the portion of segment 134 that spans the holder slot opening. The brush is then slid radially outwardly on the holder forcing the coils 130, 132 to partially uncoil and thereby increase the length of the spring segment 134 until a position like that shown in FIG. 14 is achieved. The brush locking tabs 100, 102 are used to engage the outer end of the brush to retain the brush in this retracted position, as shown in FIG. 14.

Figure 16:
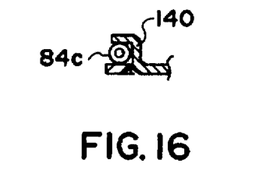
FIG. 16 is a cross section view taken along line 16—16 in FIG. 14.

Referring to FIG. 14, a wiring tab 106 of holder 80c is crimped from the condition shown in FIGS. 17 and 18 onto both the free end of brush wire 138 of brush 86c and one stripped end of wire 84c to electrically connect wire 84 to brush 86c. Each holder is also provided with retaining tabs 140 at its radially outer end as shown in FIGS. 14 and 16 (but not shown in FIGS. 17 and 18). In the case of holder 80b, its retaining tabs 140 serve to retain the insulated portion of wire 84c as it extends from holder 80c to holder 80d. At holder 80d, one of its wiring tabs 106 is crimped to electrically connect the opposite stripped end of wire 84c to the free end of the brush wire 138 of brush 86d. In like manner retaining tabs 140 of holder 80d retain the insulated portion of wire 84a whose stripped ends are respectively connected to respective brush wires 138 of brushes 86a, 86b by crimping respective wiring tabs 106 of holders 80a, 80b onto the respective connections. Thus diametrically opposite brushes are electrically connected together.

Although a connector plug, such as described earlier for the first embodiment, but not specifically illustrated, is a part of assembly 76, but again not specifically shown in the second embodiment of FIG. 14, such a connector plug is electrically connected with each of the diametrically opposite brush pairs. For example, a first wire (not shown) connects one plug terminal with brush pair 86a, 86b by crimping one of the other wiring tabs 106 of either holder 80a, 80b onto a stripped end of the first wire, while a second wire (not shown) connects the other plug terminal with brush pair 86c, 86d by crimping one of the other wiring tabs 106 of either holder 80c, 80d onto a stripped end of the second wire.

The complete brush holder assembly 76 is assembled into a stationary portion of a motor such that a rotating portion of the motor, including a commutator, (i.e. the motor armature) can pass through aperture 82. The brushes are released from the locking tabs 100, 102, and the respective springs act against the radially outer ends of the respective brushes to urge them into electrical contact with the commutator.

Figure 19:
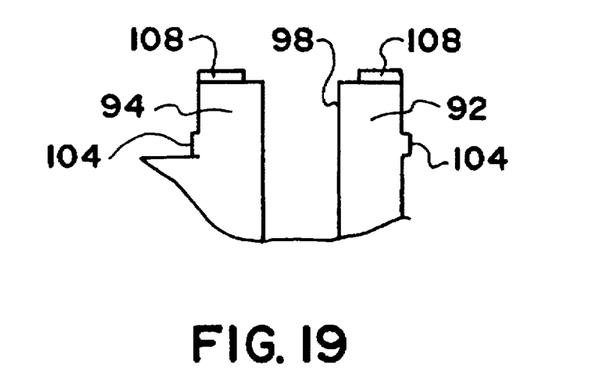
FIG. 19 is a fragmentary view of a modified form for the brush holder of FIG. 17.

FIG. 19 shows a modified form of brush holder wherein the spring locators 108 are turned at a right angle to sides 92, 94, but are at the radially inner ends of the sides. Each may have a notch like notch 110 along its laterally outer edge for retaining the spring segment 134 as it leaves the respective coils 130, 132.

Figure 20:
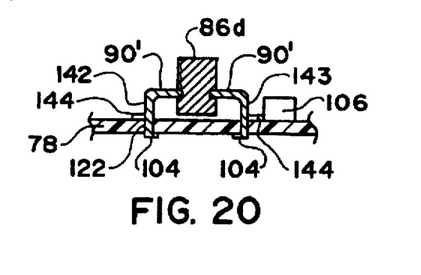
FIG. 20 is a view similar to FIG. 15 showing a modified form.

FIG. 20 shows a modified form for the holders that does not require slots 116 in brush card 78. The main body 90' comprises a flat portion, like main body 90, but with right angle flanges 142, 143 running along the laterally outer edges so that the brush is disposed entirely to one side of the brush card. Tabs 144 are turned outwardly from the lower edges of these flanges to abut the card when the holder has been inserted to the correct extent to space the brush above the card while the crimping legs 104 have been sufficiently inserted into apertures 122 to allow their projecting ends to be turned inwardly to retain the holder on the card. Notches 110 (see FIG. 18) are provided in the radially inner edge of each flange for accommodating the spring segment 134 as it leaves the respective spring coil and passes between the flat portion of main body 90' and the card, along spaces between the insides of flanges 142, 143 and respective sides of the brush; while it is preferable to provide notches 110, it may be possible to eliminate them since the spring strip will be confined between the brush card and the overlying portions of the sides 90' as it passes into association with the brush.

Figure 21:
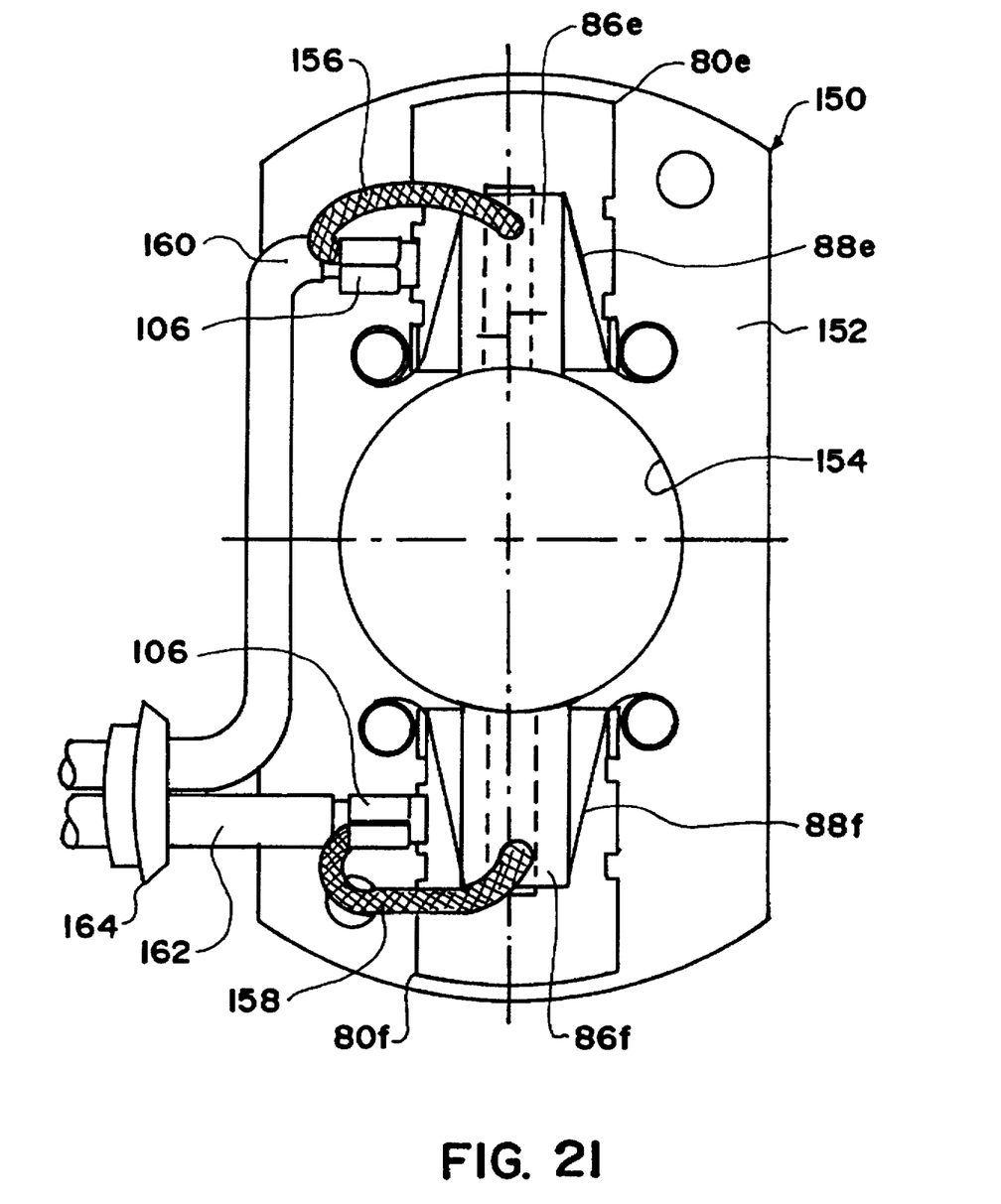
FIG. 21 is a plan view of one face of a brush holder assembly for a two-pole, single-speed motor.

FIG. 21 discloses one example of a brush holder assembly 150 for a two-pole, single-speed motor. It comprises a brush card 152 having a central aperture 154 having diametrically opposite slots to provide clearance for diametrically opposite brushes 86e, 86f, which are functionally associated with respective brush holders 80e, 80f and respective springs 88e, 88f in the same manner as the brushes in FIG. 14 are associated with their respective holders and springs. Brush holder 80f is like brush holder 80a of FIGS. 17 and 18; so is brush holder 80e, except wiring tab 106 is at the opposite side. The brush holders 80e, 80f are staked to brush card 152 in the same manner as described earlier for brush holders 80a, 80b, 80c, and 80d. The wiring tab 106 of brush holder 80e crimps both a short wire 156 from the respective brush and the stripped end of an insulated wire 160. The wiring tab 106 of brush holder 80f crimps both a short wire 158 from the respective brush and the stripped end of an insulated wire 162. A grommet 164 embraces the two wires 160, 162 as they lead to a connector plug (not shown).

Figure 22:
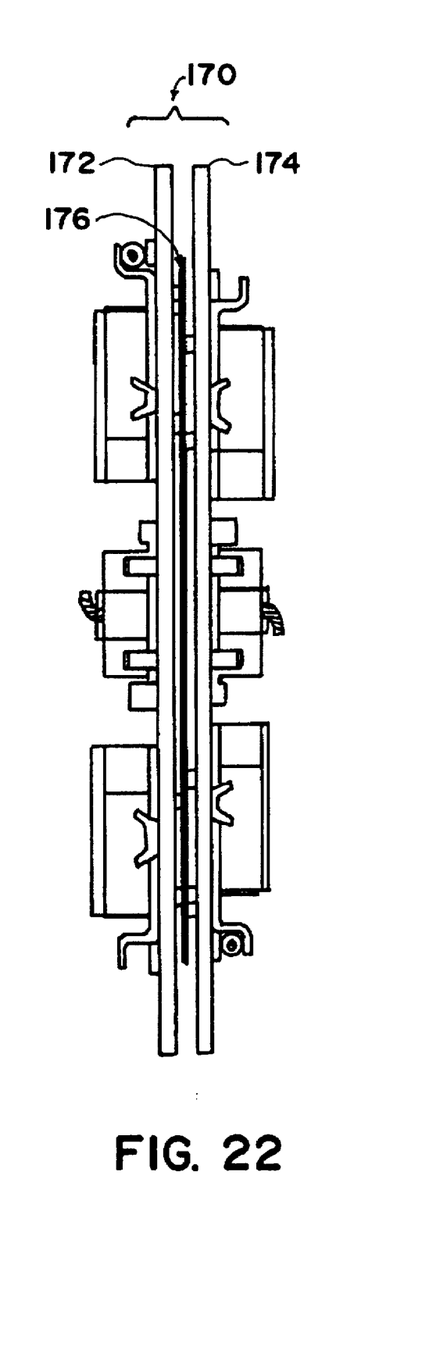
FIG. 22 is a side view of a composite brush holder assembly for a four-pole, two-speed motor comprising two individual brush holder assemblies disposed back-to-back with an intervening insulator.

FIG. 22 shows one embodiment of a four-pole, two-speed brush holder assembly 170 that comprises two generally identical brush holder assemblies 172, 174, such as those illustrated in FIG. 14 for example. The first brush holder assembly 172 is for high speed, and the second 174 is for low speed. The brush holder assemblies 172, 174 differ from the one of FIG. 14 in that the brushes are functionally associated with the brush card, the brush holders, and the springs in the manner disclosed by FIG. 20. Moreover, the low speed brush holder assembly is designed for a slightly smaller diameter commutator than is the high speed brush holder assembly. An electric insulator 176 is disposed between the two brush holder assemblies so that there is no electric current continuity between any of the conductors of one assembly and any of the conductors of the other assembly. Any suitable means of securing the two assemblies 172, 174 together with insulator 176 sandwiched between them may be employed.

Figure 2:
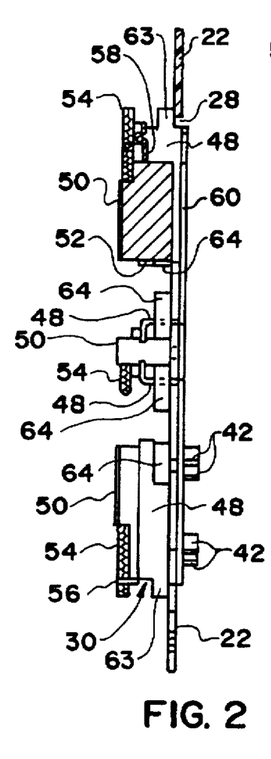
FIG. 2 is an enlarged view, partly in section, as taken along line 2—2 in FIG. 1.
Figure 3:
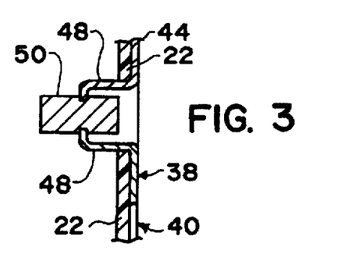
FIG. 3 is an enlarged fragmentary section view as taken along line 3—3 in FIG. 1.
Figure 23:
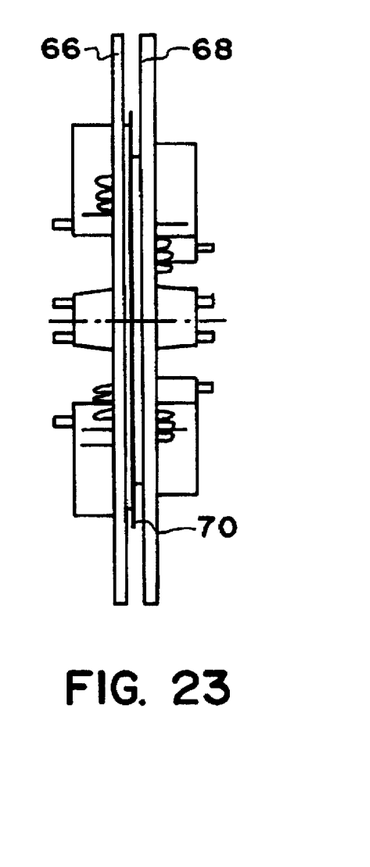
FIG. 23 is a side view of another composite brush holder assembly for a four-pole, two-speed motor comprising two individual brush holder assemblies disposed back-to-back with an intervening insulator.

To fabricate another embodiment of four-pole, two-speed brush holder assembly as illustrated in FIG. 23, it is necessary to fabricate two substantially identical brush holder assemblies, such as those illustrated in FIG. 1 for example. The first brush holder assembly 66 is for high speed and is substantially similar to the brush holder 20 of FIG. 1. However instead of forming the downturned members 42 of the wiring tabs in a direction opposite the brush holders as illustrated in FIG. 2, the members are formed in the direction of the brush holders 30. The central aperture is sized to allow the high speed commutator of the motor to extend therethrough. Additional apertures are formed in the brush card of the brush holder assembly 66 to allow the wiring tabs to extend above the top surface of the brush card.

The second brush holder assembly 68 is formed on a second brush card with the central aperture of a different, smaller size from that of the first brush card of assembly 66. This is to accommodate the second commutator of the motor. The first and second brush holder assemblies 66, 68 are positioned with their relatively flat faces facing each other and with an insulator 70 positioned between them. The insulator prevents any electrical shorting between the two brush holder assemblies.

Figure 24:
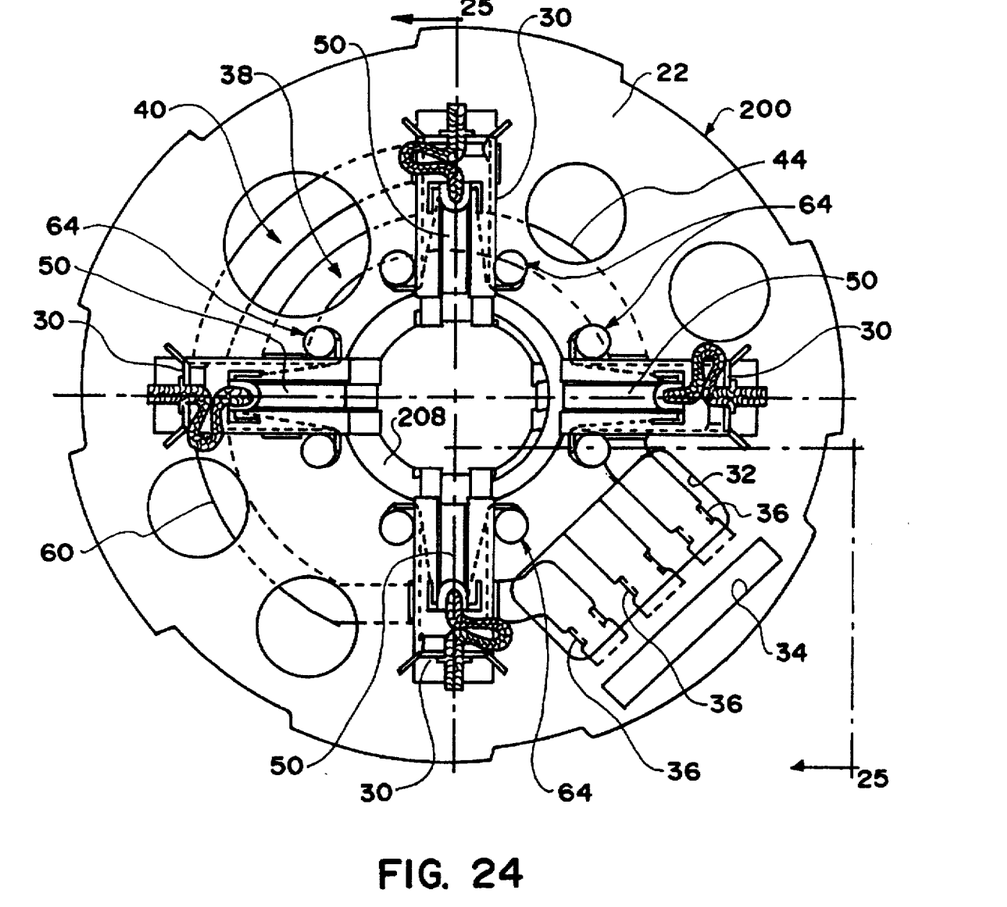
FIG. 24 is a plan view of still another composite brush holder assembly looking at the front face of the high-speed brush holder assembly.
Figure 25:
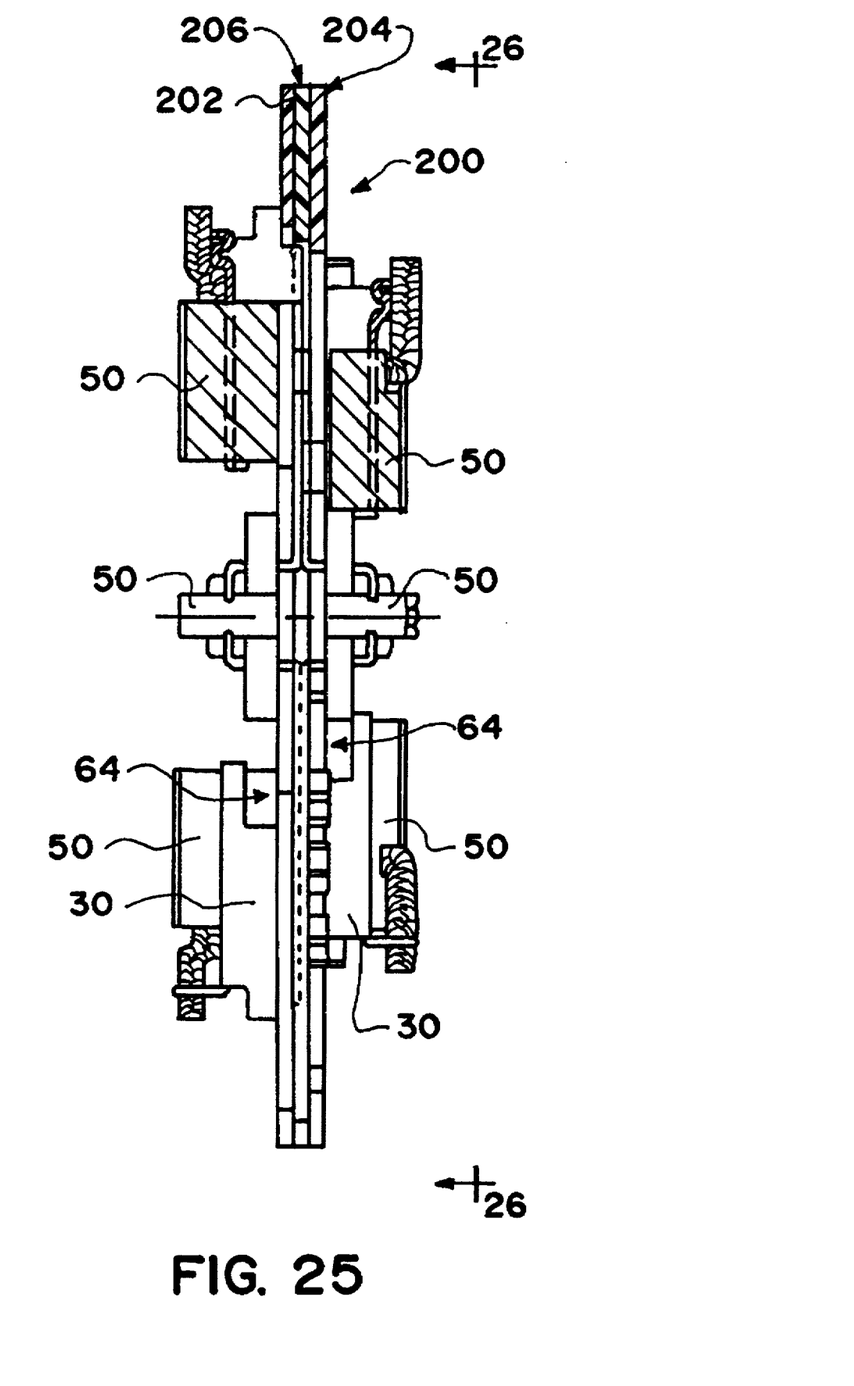
FIG. 25 is a view, partly in cross section, through the composite brush holder assembly of FIG. 24 as taken along line 25—25 in FIG. 24.

FIGS. 24 and 25 disclose still another embodiment of four-pole, two-speed brush holder assembly 200 that comprises two multi-pole, single-speed brush holder assemblies 202, 204 disposed back-to-back and assembled together with a spacer 206 sandwiched between them. Brush holder assembly 202 is the high-speed brush holder assembly and is essentially identical to brush holder assembly 20. Identical reference numerals are used in FIGS. 24 and 25 to designate parts of brush holder assembly 202 which correspond to like parts of brush holder assembly 20. Hence, brush holder assembly 202 comprises a brush card 22, a one-piece inner bus bar member 38 mounted on brush card 22 in the same manner as in brush holder assembly 20, and a one-piece outer bus bar member 40 mounted on brush card 22 in the same manner as in brush holder assembly 20. Inner bus bar member 38 comprises diametrically opposite brush holders 30 integrally joined by an integral bus bar segment 44. Outer bus bar member 40 comprises diametrically opposite brush holders 30 integrally joined by an integral bus bar segment 60. Brush holder assembly 202 further comprises brushes 50 and spring means 64 cooperatively associated with each brush holder 30 in the same manner as in brush holder assembly 20.

Brush holder assembly 204 (FIG. 26) is the low-speed brush holder assembly. It comprises a brush card 208 that is similar to brush card 22, a one-piece inner bus bar member 210, and a one-piece outer bus bar member 212, both of which members are mounted on brush card 208 in the same manner as bus bar members 38 and 40 are on brush card 22 in brush holder assembly 20. Inner bus bar member 210 comprises diametrically opposite brush holders 30 integrally joined by an integral bus bar segment 214. Outer bus bar member 212 comprises diametrically opposite brush holders 30 integrally joined by an integral bus bar segment 216. Brush holder assembly 204 further comprises brushes 50 and spring means 64 cooperatively associated with each brush holder 30 in the same manner as in brush holder assembly 20.

Figure 27:
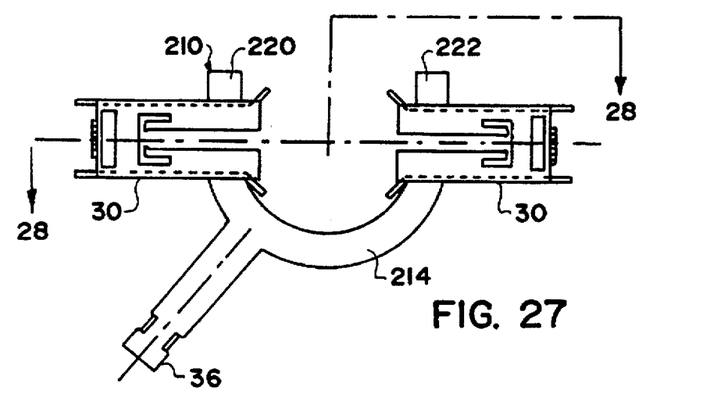
FIG. 27 is a plan view of the inner bus bar member of the low-speed brush holder assembly of FIG. 26 by itself prior to association with its brush card.
Figure 28:
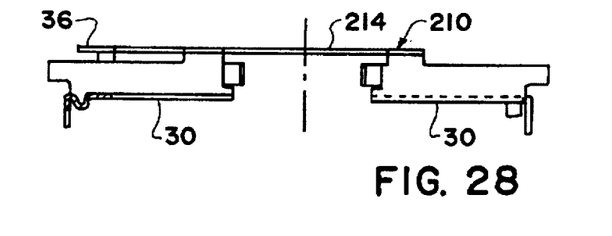
FIG. 28 is a view, partly in section, as taken as taken along line 28—28 in FIG. 27.

Bus bar segment 214 of inner bus bar member 210 (see FIGS. 27 and 28) is flat and has a circumferential extent that is at a constant radius concentric with the brush card's central aperture 218. The radial dimension of segment 214 is constant throughout its circumferential extent, and its axial dimension (i.e., its thickness) is also uniform throughout. When assembled to brush card 208, segment 214 is disposed flat against a region of the brush card's face that confronts the face of brush card 22 against which bus bars segments 44 and 60 are disposed. For convenience, bus bar member 210 is provided with two flat short tabs 220, 222 that will also be disposed flat against the same face of the brush card as segment 214, with each tab 220, 222 extending from the lateral side of the respective brush holder 30 that is opposite the side where segment 214 integrally joins with the brush holder.

Figure 29:
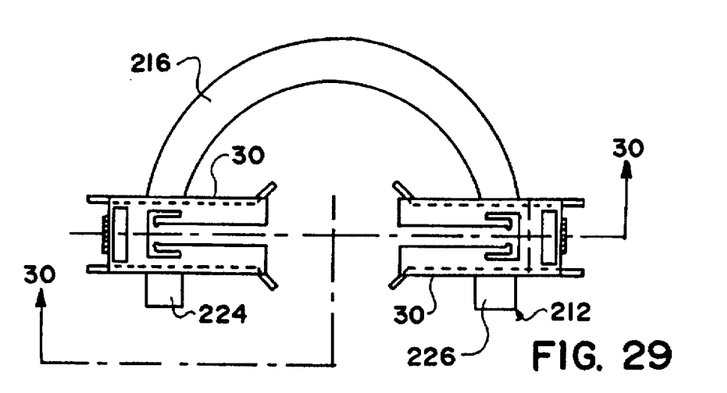
FIG. 29 is a plan view of the outer bus bar member of the low-speed brush holder assembly of FIG. 26 by itself prior to association with its brush card.
Figure 30:
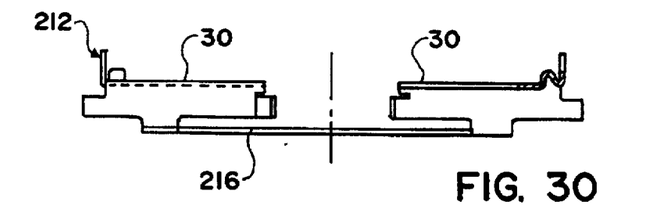
FIG. 30 is a view, partly in section, as taken as taken along line 30—30 in FIG. 29.

Bus bar segment 216 of outer bus bar member 212 (shown by itself in FIGS. 29 and 30) is flat and has a circumferential extent that is at a constant radius concentric with the brush card's central aperture 218. The radial dimension of segment 216 is constant throughout its circumferential extent, and its axial dimension (i.e., its thickness) is also uniform throughout. When assembled to brush card 208, segment 216 is disposed flat against a region of the brush card's face that confronts the face of brush card 22 against which bus bars segments 44 and 60 are disposed. For convenience, bus bar member 212 is provided with two flat short tabs 224, 226 that will also be disposed flat against the same face of the brush card as segment 212, with each tab 224, 226 extending from the lateral side of the respective brush holder 30 that is opposite the side where segment 212 integrally joins with the brush holder. While bus bar members 210, 212 differ in that segment 216 is at a larger radius than segment 214 so that they will be radially spaced apart when the bus bar members are assembled to the brush card, they also differ in that inner bus bas member 210 comprises an integral wiring tab 36 extending radially outwardly from bus bar segment 214, while outer bus bar member 212 does not.

In the particular example depicted by brush holder assembly 200, the brush holders 30 of assembly 202 are in circumferential alignment with those of brush holder assembly 204, but are disposed somewhat radially outwardly on their brush card 22 in comparison to those on brush card 208 of assembly 204. The radial locations of bus bar segments 214, 216 of the low-speed assembly 204 are chosen relative to the radial locations of bus bar segments 44, 60 of high-speed assembly 202 to provide at least partial radial overlapping along at least portions of their circumferential extent such that in assembly 200, at least a portion of segment 216 will be in abutment with at least a portion of segment 44, thereby placing them in electrical contact to thereby establish electric continuity between the brushes disposed in the brush holders that are integrally formed with bus bar members 38 and 212. Preferably, the overlapped, abutted segments are of equal radial dimension and located on a common radius so that they congruently mutually radially overlap along at least portions of their circumferential extents. In the example of FIG. 24, essentially the entire circumferential extent of bus bar segment 216 is in congruent abutment with bus bar segment 44.

Wiring tabs 36 of bus bar members 38 and 40 are disposed to register with opposite end portions of apertures 32 and 34 of brush card 22. Card 208 has apertures 232, 234 that register with apertures 32, 34 in assembly 200, and wiring tab 36 of inner bus bar member 210 is disposed to register with an intermediate portion of its card's apertures 232, 234 such that in assembly 200, there are three wiring tabs 36 disposed side-by-side at the registered apertures.

Figure 26:
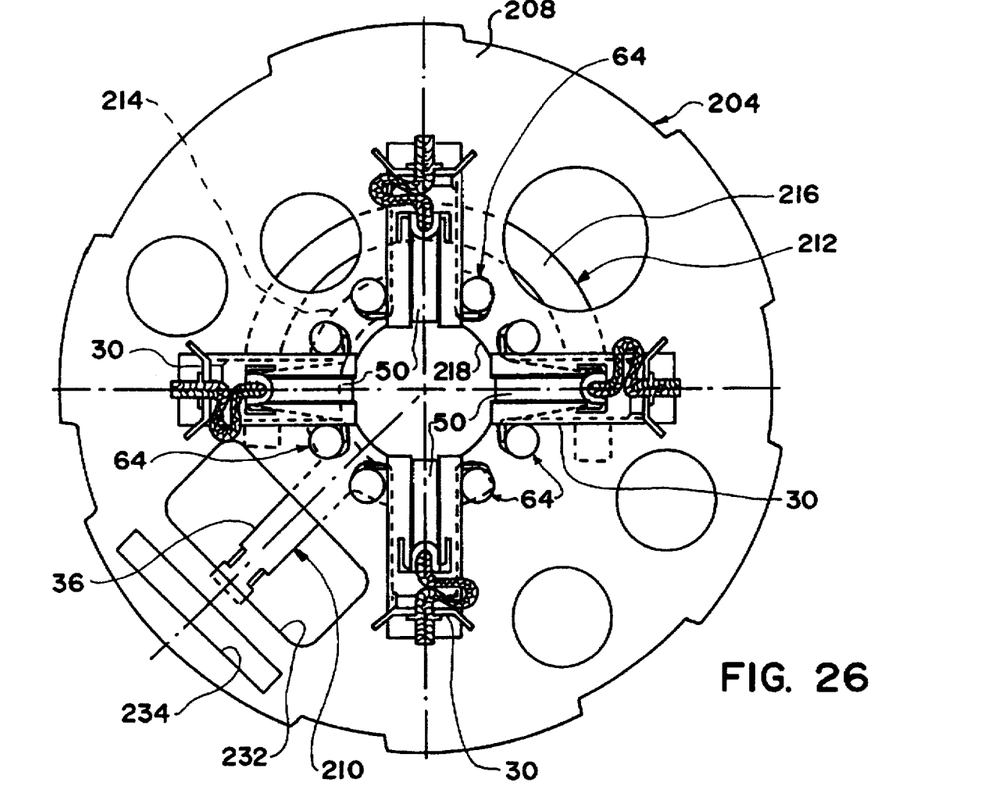
FIG. 26 is plan view of the front face of the low-speed brush holder assembly of the composite brush holder assembly of FIGS. 24 and 25, as taken as taken along line 26—26 in FIG. 25.
Figure 31:
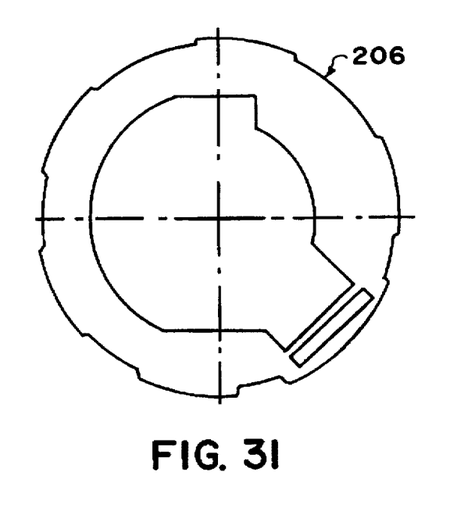
FIG. 31 is a plan view of a spacer used in the composite brush holder assembly of FIG. 25, looking in the same direction as the view of FIG. 24, but on a reduced scale.
Figure 32:
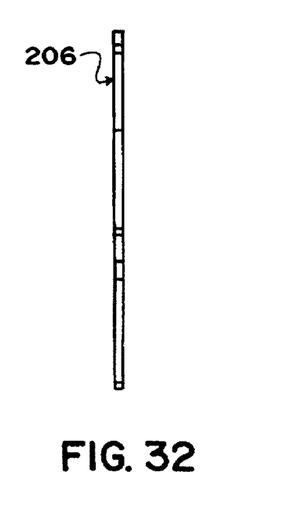
FIG. 32 is a right side view of FIG. 31.

FIGS. 31 and 32 show spacer 206 to comprise an annular shape of uniform thickness that is apertured to allow bus bar segments 44 and 216 to mutually abut, as just explained above, and to accommodate wiring tabs 36 for attachment of wires leading to a plug (not shown). Importantly, the axial dimension (i.e. thickness) of spacer 206 is less than or equal to the sum of the thicknesses of the segments 44 and 216 so that it will not interfere with their attaining mutual electrical contact when the two assemblies 202, 204 are joined together to sandwich spacer 206 between them as shown in FIG. 26. The joining may be accomplished by any suitable means of attachment. One example of joining the two assemblies 202, 204 can comprise mechanical fastening means fastening the two brush cards together to cause segments 44 and 216 to mutually abut. Attachment can even be done at the two segments 44, 216 themselves, and in different ways. One way is to run mechanical fasteners through the assemblies, including the brush cards, at one or more locations where segments 44, 216 are mutually abutting. Another way is to provide aligned clearance apertures in the brush cards at one or more locations where segments 44, 216 are mutually abutting, and then using these clearance holes as access to the abutting segments for fusing the segments together.

Because no parts of inner bus bar member 210 that may be present on the back face of card 208 directly confront any conductive parts on the back face of the opposite card 22, material of spacer 206 need not be present at any such parts of bus bar member 210. Likewise, because no parts of outer bus bar member 40 that may be present on the back face of card 22 directly confront any conductive parts on the back face of card 208, material of spacer 206 need not be present at any such parts of bus bar member 40. In other configurations, different from the one illustrated in the drawings, where a possibility exists that undesired contact may occur, material of spacer 206 should be present.

The radially outer margins of brush cards 22 and 208 and of spacer 206 are formed with registering keys to fixedly locate brush holder assembly 200 in proper position within a motor at assembly.

The brush holders are formed of suitable strip stock material and fabricated by conventional fabrication technology comprising stamping and trimming methods so that each holder is of one-piece construction.

By providing the novel means of establishing electric continuity between the bus bar members 38 and 212 on the two cards, only three wiring tabs 36 are required. When a motor that contains assembly 200 is operated at high speed, suitable voltage is applied across the two wiring tabs 36 that are part of bus bar members 38 and 40 respectively while the wiring tab of bus bar member 210 is left floating so that voltage is applied to the high-speed brush card assembly 202 associated with the motor's high speed commutator and armature. When such a motor is operated at low speed, suitable voltage is applied across the two wiring tabs 36 that are part of bus bar members 38 and 210 respectively while the wiring tab of bus bar member 40 is left floating so that voltage is applied to the low-speed brush card assembly 204 associated with the motor's low speed commutator and armature.

While a presently preferred embodiment of the invention has been illustrated and described, it should be appreciated that principles of the invention apply to all embodiments falling within the scope of the following claims.

What is claimed:

1. A multi-pole, two-speed brush holder assembly comprising:

a high-speed brush holder assembly and a low-speed brush holder assembly;

said high-speed brush holder assembly comprising a non-electrically conductive brush card having two sides, namely a first side and a second side, and a central aperture extending between said sides, a plurality of brush holders disposed on said card's first side and spaced circumferentially around said aperture, electrically conductive brushes guided by said brush holders for motion radially of said aperture, spring means for urging each of said brushes radially inward toward said aperture, and an electric conductor disposed on the card's second side and electrically connecting the brush of a first of said brush holders with the brush of a second of said brush holders;

said low-speed brush holder assembly comprising a non-electrically conductive brush card having two sides, namely a first side and a second side, and a central aperture extending between said sides of said low-speed brush holder assembly's brush card, a plurality of brush holders disposed on the first side of said low-speed brush holder assembly's brush card and spaced circumferentially around said aperture of said low-speed brush holder assembly's brush card, electrically conductive brushes guided by said brush holders on said low-speed brush holder assembly's brush card for motion radially of said aperture of said low-speed brush holder assembly's brush card, spring means for urging each of said brushes of said low-speed brush holder assembly's brush card radially inward toward said aperture of said low-speed brush holder assembly's brush card, and an electric conductor disposed on the second side of said low-speed brush holder assembly's brush card and electrically connecting the brush of a first of said brush holders on said low-speed brush holder assembly's brush card with the brush of a second of said brush holders on said low-speed brush holder assembly's brush card;

means joining said brush cards together with said second sides of said brush cards mutually confronting and with said electric conductors mutually abutting to establish electric continuity between said electric conductors, wherein the brushes of brush holders on the high-speed brush holder assembly's brush card, other than the brushes of the first and second brush holders on the high-speed brush holder assembly's brush card, do not have electric continuity with the brushes of any brush holders on the low-speed brush holder assembly's brush card, and wherein the brushes of brush holders on the low-speed brush holder assembly's brush card, other than the brushes of the first and second brush holders on the low-speed brush holder assembly's brush card, do not have electric continuity with the brushes of any brush holders on the high-speed brush holder assembly's brush card.

2. A multi-pole, two-speed brush holder assembly as set forth in claim 1 in which said second sides of said brush cards are disposed in axially spaced apart, substantially parallel planes, each of said electric conductors comprises a respective flat segment disposed flat against the second side of its respective brush card and having a certain thickness, said flat segments mutually axially abutting to establish electric continuity between said electric conductors, and a spacer having two sides and a certain thickness, said spacer having certain portions of its respective sides disposed against certain regions of respective ones of said brush cards' second sides, and said thickness of said spacer is no greater than the sum of the thicknesses of said flat segments.

3. A multi-pole, two-speed brush holder assembly as set forth in claim 2 in which each of said segments extends circumferentially about its brush card's aperture, and said segments are at least partially radially overlapping.

4. A multi-pole, two-speed brush holder assembly as set forth in claim 3 in which said segments are congruently radially overlapping.

5. A multi-pole, two-speed brush holder assembly as set forth in claim 4 in which said segments lie on a common radius relative to their respective apertures and have substantially equal radial dimensions.

6. A multi-pole, two-speed brush holder assembly as set forth in claim 1 in which each of said high-speed and said low-speed brush holder assemblies comprises its first and second brush holders arranged 180 degrees apart about the respective brush card's central aperture, and third and fourth brush holders arranged 180 degrees apart about the respective brush card's central aperture and 90 degrees apart from the respective first and second brush holders, and high-speed and said low-speed brush holder assemblies further including a respective further electric conductor electrically connecting the brushes of the respective third and fourth brush holders on the respective brush card.

7. A multi-pole, two-speed brush holder assembly as set forth in claim 6 in which the respective further electric conductor of one of said high-speed and low-speed brush holder assemblies is disposed radially outwardly of the respective further electric conductor of the other of said high-speed and low-speed brush holder assemblies.

8. A multi-pole, two-speed brush holder assembly as set forth in claim 7 in which the respective further electric conductor of said high-speed brush holder assembly is disposed radially outwardly of the respective further electric conductor of said low-speed brush holder assembly, and the mutually abutting electric conductors are disposed radially intermediate said respective further electric conductors.

9. A multi-pole, two-speed brush holder assembly as set forth in claim 8 in which each of the respective further electric conductors comprises a respective flat segment disposed flat against said second side of its respective brush card.

10. A multi-pole, two-speed brush holder assembly as set forth in claim 1 in which said first and second brush holders on both the high-speed and low-speed brush holder assemblies are electrically conductive, the respective brushes of the first and second brush holders on both the high-speed and low-speed brush holder assemblies are electrically connected to the respective brush holder, and the respective electric conductors electrically connect the respective first and second brush holders on the respective brush card.

11. A multi-pole, two-speed brush holder assembly as set forth in claim 10 in which the respective electric conductors are integrally formed with the respective first and second brush holders on the respective brush card such that each first and second brush holder and their respective electric conductor are of integral one-piece construction.

12. A multi-pole, two-speed brush holder assembly as set forth in claim 11 in which each of the respective electric conductors comprises a flat segment disposed flat against the second side of its respective brush card.

13. A multi-pole, two-speed brush holder assembly as set forth in claim 12 further including a spacer having two sides and a certain thickness, said spacer having certain portions of its respective sides disposed against certain regions of respective ones of said brush cards' second sides and said thickness of said spacer is no greater than the sum of the thicknesses of said flat segments.

14. A multi-pole, two-speed brush holder assembly as set forth in claim 12 including an integral wiring tab extending from the flat segment that is disposed flat against the second side of the brush card of the high-speed brush holder assembly.

15. A multi-pole, two-speed brush holder assembly as set forth in claim 14 including third and fourth brush holders disposed on each respective brush card, a respective further electric conductor, including a respective integral wiring tab, electrically connecting the brushes of the respective third and fourth brush holders on each respective brush card.

16. A multi-pole, multi-speed brush holder assembly comprising:

a first speed brush holder assembly comprising a non-electrically conductive brush card having two sides, namely a first side and a second side, and a central aperture extending between said sides, a pair of brush holders disposed on said card's first side and spaced circumferentially around said aperture, electrically conductive brushes guided by said brush holders for motion radially of said aperture, spring means for urging each of said brushes radially inward toward said aperture, and an electric conductor disposed on the card's second side and electrically connecting the brush of a first of said brush holders with the brush of a second of said brush holders;

a second speed brush holder assembly comprising a non-electrically conductive brush card having two sides, namely a first side and a second side, and a central aperture extending between said sides of said second speed brush holder assembly's brush card, a pair of brush holders disposed on the first side of said second speed brush holder assembly's brush card and spaced circumferentially around said aperture of said second speed brush holder assembly's brush card, electrically conductive brushes guided by said brush holders on said second speed brush holder assembly's brush card for motion radially of said aperture of said second speed brush holder assembly's brush card, spring means for urging each of said brushes of said second speed brush holder assembly's brush card radially inward toward said aperture of said second speed brush holder assembly's brush card, and an electric conductor disposed on the second side of said second speed brush holder assembly's brush card and electrically connecting the brush of a first of said brush holders on said second speed brush holder assembly's brush card with the brush of a second of said brush holders on said second speed brush holder assembly's brush card;

means joining said brush cards together with said second sides of said brush cards mutually confronting and with said electric conductors mutually abutting to establish electric continuity between said electric conductors;

and a spacer sandwiched between said first and second speed brush holder assemblies and having aperture means to allow said electric conductors to be mutually abutting to establish electric continuity between said electric conductors.

17. A multi-pole, multi-speed brush holder assembly as set forth in claim 16 in which each of said electric conductors comprises a respective flat segment disposed flat against said second side of its respective brush card and having a certain thickness, said flat segments mutually axially abutting to establish electric continuity between said electric conductors, and the thickness of said spacer is no greater than the sum of the thicknesses of said flat segments.

18. A multi-pole, multi-speed brush holder assembly as set forth in claim 17 in which the first and second brush holders on both the first speed and the second speed brush holder assemblies are electrically conductive, the respective brushes of the first and second brush holders on both the first speed and the second speed brush holder assemblies are electrically connected to the respective brush holder, and the respective electric conductors electrically connect the respective first and second brush holders on the respective brush card.

19. A multi-pole, multi-speed brush holder assembly as set forth in claim 18 in which the respective electric conductors are integrally formed with the respective first and second brush holders on the respective brush card such that each first and second brush holder and their respective electric conductor are of integral one-piece construction.

20. A multi-pole, two-speed brush holder assembly comprising:
   a high-speed brush holder assembly and a low-speed brush holder assembly;
   said high-speed brush holder assembly comprising a non-electrically conductive brush card having two sides, namely a first side and a second side, a plurality of brush holders disposed circumferentially spaced apart on said card's first side, a respective electrically conductive brush guided by a respective one of said brush holders and based by a spring means for said high-speed brush holder assembly in a direction of motion relative to the respective brush holder, and an electric conductor disposed on the brush card's second side and electrically connecting the brush of a first of said brush holders with the brush of a second of said brush holders;
   said low-speed brush holder assembly comprising a non-electrically conductive brush card having two sides, namely a first side and a second side, a plurality of brush holders disposed circumferentially spaced apart on the first side of said low-speed brush holder assembly's brush card, a respective electrically conductive brush guided by a respective one of said brush holders on said low-speed brush holder assembly's brush card and biased by a spring means for said low-speed brush holder assembly in a direction of motion relative to the respective brush holder on said low-speed brush holder assembly's brush card, and an electric conductor disposed on the second side of said low-speed brush holder assembly's brush card and electrically connecting the brush of a first of said brush holders on said low-speed brush holder assembly's brush card with the brush of a second of said brush holders on said low-speed brush holder assembly's brush card;
   means joining said brush cards together with said second sides of said brush cards mutually confronting and with said electric conductors mutually abutting to establish electric continuity between said electric conductors, wherein the brushes of brush holders on the high-speed brush holder assembly's brush card, other than the brushes of the first and second brush holders on the high-speed brush holder assembly's brush card, do not have electric continuity with the brushes of any brush holders on the low-speed brush holder assembly's brush card, and wherein the brushes of brush holders on the low-speed brush holder assembly's brush card, other than the brushes of the first and second brush holders on the low-speed brush holder assembly's brush card, do not have electric continuity with the brushes of any brush holders on the high-speed brush holder assembly's brush card.

21. A multi-pole, multi-speed brush holder assembly comprising:
   a first speed brush holder assembly comprising a non-electrically conductive brush card having two sides, namely a first side and a second side, a pair of brush holders disposed circumferentially spaced apart on said card's first side, a respective electrically conductive brush guided by a respective one of said brush holders and biased by a spring means for said first speed brush holder assembly in a direction of motion relative to the respective brush holder, and an electric conductor disposed on the brush card's second side and electrically connecting the brush of a first of said brush holders with the brush of a second of said brush holders;
   a second speed brush holder assembly comprising a non-electrically conductive brush card having two sides, namely a first side and a second side, a pair of brush holders disposed circumferentially spaced apart on the first side of said second speed brush holder assembly's brush card, a respective electrically conductive brush guided by a respective one of said brush holders on said second speed brush holder assembly's brush card and biased by a spring means for said second speed brush holder assembly in a direction of motion relative to the respective brush holder on said second speed brush holder assembly's brush card, and an electric conductor disposed on the second side of said second speed brush holder assembly's brush card and electrically connecting the brush of a first of said brush holders on said second speed brush holder assembly's brush card with the brush of a second of said brush holders on said second speed brush holder assembly's brush card;
   means joining said brush cards together with said second sides of said brush cards mutually confronting and with said electric conductors mutually abutting to establish electric continuity between said electric conductors;
   and a spacer sandwiched between said first and second speed brush holder assemblies and having aperture means to allow said electric conductors to be mutually abutting to establish electric continuity between said electric conductors.

22. A brush card assembly comprising two brush cards, each brush card comprising flat sides, plural brush holders mounted on each brush card, each of said plural brush holders comprising laterally spaced apart sides providing lengthwise guidance for positioning of a respective brush along the respective brush holder and being disposed on one of said flat sides of the respective brush card, the other of said flat sides of said brush cards being disposed to face each other, and conductor means electrically connecting brush holders on each brush card, wherein at least a portion of each conductor means is disposed on the other flat face of its respective brush card, and further including insulator means positioned between said other flat faces of said brush cards to electrically insulate said portions of the respective conductor means on the respective brush cards from each other.

23. A brush card assembly as set forth in claim 22 in which said portion of each conductor means comprises a respective bus bar that is an integral formation of the respective brush holders that the respective conductor means electrically connects on the respective card.

* * * * *